United States Patent
Gunzelmann

(10) Patent No.: US 8,536,479 B2
(45) Date of Patent: Sep. 17, 2013

(54) METHOD FOR WELDING SHAFTS ON VERTICAL ROTATIONAL AXIS

(75) Inventor: Karl-Heinz Gunzelmann, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/377,444

(22) PCT Filed: Jun. 9, 2010

(86) PCT No.: PCT/EP2010/058088
§ 371 (c)(1), (2), (4) Date: Dec. 9, 2011

(87) PCT Pub. No.: WO2010/142726
PCT Pub. Date: Dec. 16, 2010

(65) Prior Publication Data
US 2012/0088591 A1    Apr. 12, 2012

(30) Foreign Application Priority Data
Jun. 10, 2009 (DE) .......... 10 2009 024 581

(51) Int. Cl.
*B23K 31/02* (2006.01)

(52) U.S. Cl.
USPC .......................... 219/61; 29/DIG. 48

(58) Field of Classification Search
USPC ............ 464/183; 219/60.2, 60 R, 61, 75, 219/76.15, 137 R; 29/598, DIG. 48; 310/261.1; 415/122.1; 403/270, 271
See application file for complete search history.

(56) References Cited

U.S. PATENT DOCUMENTS

| | | | | |
|---|---|---|---|---|
| 2,637,521 A | * | 5/1953 | Constantine et al. . | 219/137 R X |
| 3,137,782 A | * | 6/1964 | Rieppel et al. ........ | 219/61 |
| 3,542,991 A | * | 11/1970 | Lindquist ........... | 219/61 |
| 4,633,554 A | * | 1/1987 | Clark et al. ......... | 219/61 X |

\* cited by examiner

*Primary Examiner* — Gregory Binda
(74) *Attorney, Agent, or Firm* — Staas & Halsey LLP

(57) ABSTRACT

A first tubular, inner radial annular seam is produced to weld together two hollow cylinders by narrow-gap tungsten inert gas arc welding. Narrow-gap metal gas-shielded arc welding is used to create another tubular, outer radial annular seam to further weld together both hollow cylinders. In this manner, the rotational axis of the rotor shaft remains vertically aligned throughout the entire production method of welding together the shaft parts. In this manner, the required production time can be advantageously reduced and the use of welding filler can be effectively decreased.

6 Claims, 2 Drawing Sheets

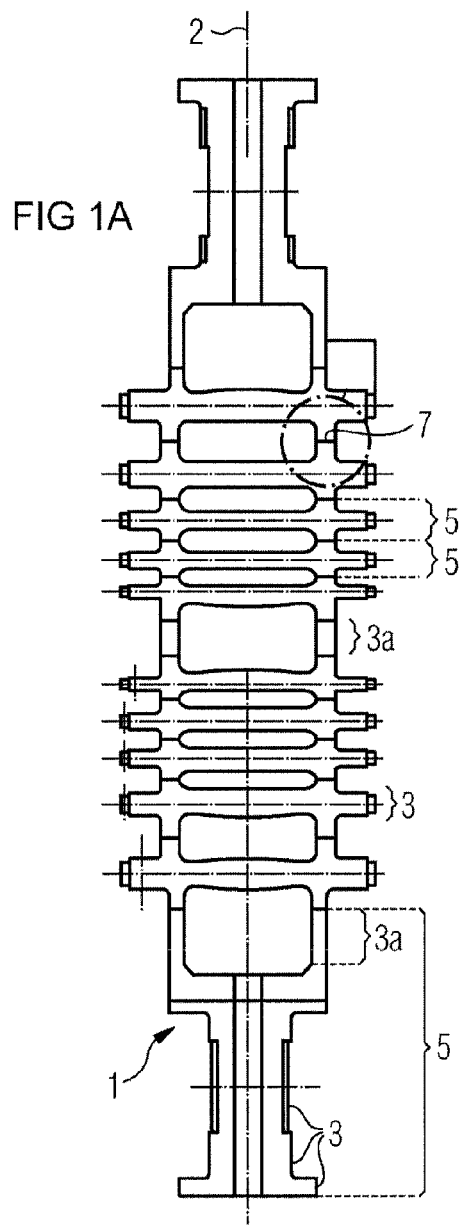
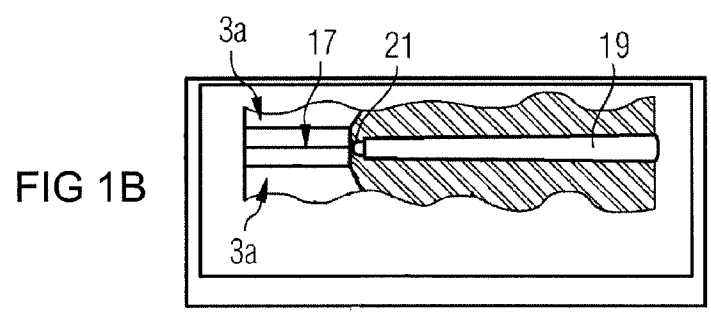
FIG 1A
FIG 1B

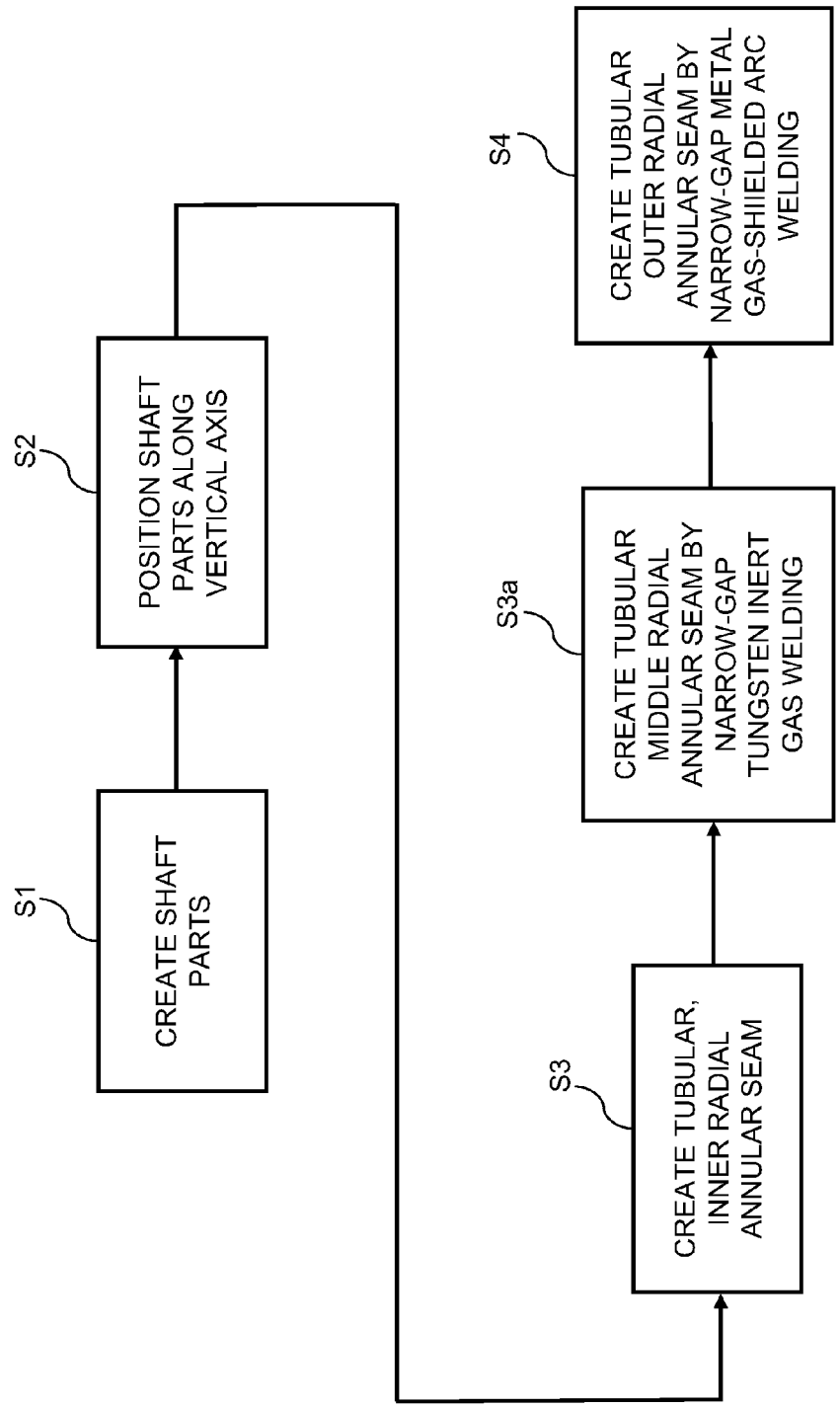

METHOD FOR WELDING SHAFTS ON VERTICAL ROTATIONAL AXIS

CROSS REFERENCE TO RELATED APPLICATIONS

This application is the U.S. national stage of International Application No. PCT/EP2010/058088, filed Jun. 9, 2010 and claims the benefit thereof. The International Application claims the benefits of German Application No. 102009024581.2 filed on Jun. 10, 2009, both applications are incorporated by reference herein in their entirety.

BACKGROUND

During the joint welding of rotor shafts in turbine and generator construction, so-called narrow-gap arc welding technology is used to assemble forged shaft parts to form a complete rotor.

With known methods, if it is intended to provide more than two joints per rotor, the rotor portions are stacked one on top of each other in a vertical axis arrangement and welded together in two steps. Here, the welding of the first beads, so-called root welding, is performed using the so-called narrow-gap tungsten inert gas (TIG) method. After root welding of all joints, the rotor is tilted from the vertical axis position into the horizontal axis position and the remaining seam cross section welded in this position according to the so-called narrow-gap submerged arc welding method (SAW).

The required joint cross section, i.e. the bead thickness of the root weld, results from the requirement for the partially welded rotor to have sufficient mechanical strength for the tilting process. Depending upon the partial rotor mass ratios, the usual TIG bead thicknesses lie between about 20 mm and 30 mm. The tilting is necessary to enable the remaining seam cross section to be welded more quickly and economically using the high-performance SAW method. The root-welded rotor has to be tilted because the SAW method cannot be used efficiently with a horizontal position of the rotor axis. In addition, with certain rotor materials, an additional heat supply is required to prevent cracking due to the tilting.

SUMMARY

It is an aspect of the method to avoid the tilting of a rotational axis of the shaft from vertical to horizontal and the associated readjustment of the shaft during narrow-gap arc welding of shaft parts to form a shaft, particularly a rotor shaft for a turbine and/or a generator. This should reduce the production time and save welding filler.

According to a first aspect, a method is provided for joint welding a rotor shaft, particularly for a turbine and/or a generator, as follows: creation of shaft parts, which are symmetrical about a rotational axis and coaxial along the rotational axis, including at least one hollow cylinder and optionally at least one cylinder; positioning in each case of two shaft parts along the vertical rotational axis coaxially one on top of the other, wherein, in each case, the annular surfaces of two hollow cylinders abut each other; creation of a first, tubular, inner radial annular seam in order to weld together the two hollow cylinders in an inner radial region of the associated annular surfaces by narrow-gap tungsten inert gas arc welding. The creation of a further, tubular, outer radial annular seam to further weld together the hollow cylinders in an outer radial region of the associated annular surfaces by narrow-gap metal gas-shielded arc welding is performed while the rotational axis remains vertically aligned.

Thus, a shaft, particularly a rotor shaft for a turbine and/or a generator, is created by this method.

Inner radial is taken to mean lying along a radius extending from the rotational axis in an inner region of the two hollow cylinders to be joined by welding in an inner radial region of the associated annular surfaces. Outer radial means lying along a radius extending from the rotational axis in an outer region of the two hollow cylinders to be joined by welding in an outer radial region of the associated annular surfaces. Middle radial means lying along a radius extending from the rotational axis in a middle region of the two hollow cylinders to be joined by welding in a middle radial region of the associated annular surfaces. A tubular annular seam joins two tubular hollow cylinders positioned one on top of the other.

A first, tubular, inner radial annular seam can also be called a root weld.

If, after the creation of the root weld, narrow-gap metal gas-shielded arc welding is used, tilting may be dispensed with entirely. Narrow-gap metal gas-shielded arc welding is wherein that the fact that it is also able to provide high filling levels with the required quality with a vertical rotor axis and hence with a horizontal welding position.

The advantage of this method lies in the fact that, on the one hand, the downtimes due to the tilting and readjustment in the case of a horizontal rotor axis, i.e., in the case of a vertical welding position, are dispensed with and in this way it is possible to save production time. Depending upon the joint cross section, this can achieve a time saving of 25% to 30% compared to the TIG-SAW combination. A further advantage is obtained from the fact that, with narrow-gap metal gas-shielded arc welding, a joint cross section is up to 40% smaller than with the SAW method.

This also achieves a saving of welding filler of approximately the same order of magnitude.

According to an advantageous embodiment, initially the first, tubular, inner annular seam is welded between two shaft parts and immediately thereafter the further, tubular, outer radial annular seam of the two shaft parts. This enables a segment to be completed before cooling.

According to a further advantageous embodiment, a further, tubular, middle radial annular seam for the further welding together of the two hollow cylinders can be created by narrow-gap tungsten inert gas welding, and, to be precise, after the creation of the first, tubular inner radial annular seam and before the creation of the further, tubular, outer radial annular seam. In this way, the first, tubular, inner radial annular seam is supplemented and reinforced by the further, tubular middle radial annular seam.

According to a further advantageous embodiment, it is possible initially to weld the further, tubular, middle radial annular seams the entire rotor shaft and only thereafter all further, tubular outer radial annular seams of all shaft parts.

According to a further advantageous embodiment, the further, tubular, middle radial annular seams can be 2 mm to 20 mm thick radially.

According to a further advantageous embodiment, the narrow-gap metal gas-shielded arc welding can be narrow-gap metal inert gas arc welding or narrow-gap metal active gas arc welding.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 1A is a side view and FIG. 1B is a partial cross section of an exemplary embodiment of a shaft;

FIG. 2 a flowchart of an exemplary embodiment of the method.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

FIG. 1A shows an exemplary embodiment of a shaft 1 produced using the method described below. In principle, all shafts or axles may be of the same design. A rotor shaft is used, for example, for a turbine and/or a generator. The shaft 1 is formed of shaft parts 5. The shaft parts 5 are each case rotationally symmetrical about a common rotational axis 2. In welded condition, all shaft parts lie coaxially along this common rotational axis 2. The geometry of the shaft parts 5 is determined by the fact that the shaft parts 5 include at least one hollow cylinder 3a coaxially positioned along the rotational axis 2. For example, one shaft part 5 can be formed of one partial cylinder 3 and two hollow cylinders 3a in each case abutting the partial cylinder. To this end, one shaft part 5 can also be symmetrical to a middle surface positioned perpendicularly to the rotational axis 2. A shaft part 5 including a hollow cylinder 3a can have a bottom ring surface and a top ring surface. These main limiting ring surfaces are a bottom ring surface and a top ring surface of the shaft part. The bottom ring surface can be the bottom ring surface of a hollow cylinder 3a of a shaft part 5 and the top ring surface can be the top ring surface of a further hollow cylinder 3a of the shaft part 5. For the welding all the shaft parts 5, these are positioned coaxially one on top of the other along the common vertical rotational axis 2. This means that all shaft parts 5 have a common rotational axis 2. This is for welding in vertical alignment. In each case, two shaft parts 5 are positioned coaxially one on top of the other along the vertical rotational axis 2, wherein in each case two annular surfaces 7 abut each other and are in planar contact. In FIG. 1, the region of two hollow cylinders 3a to be welded is encompassed by a circular line. Accordingly, the circular segment in FIG. 1A is shown enlarged in partial cross section in FIG. 1B. At the same time, according to FIGS. 1A and 1B, three tubular annular seams join two hollow cylinders 3a planarly with each other in the region of the annular surfaces 7. To this end, a first, tubular, inner radial annular seam 17 is created in order to weld together the two hollow cylinders 3a by narrow-gap tungsten inert gas arc welding. This inner annular seam 17 joins an inner region of the two annular surfaces 7. This is shown on the left of the enlarged segment of FIG. 1B. In addition, a further, tubular outer radial annular seam 19 is created in order further to weld together the two hollow cylinders 3a by narrow-gap metal gas-shielded arc welding. To create this further, tubular, outer radial annular seam 19, the rotational axis 2 can remain vertically aligned. The narrow-gap metal gas-shielded arc welding can be narrow-gap metal inert gas arc welding or narrow-gap metal gas-shielded arc welding. Between the first, tubular, inner radial annular seam 17 and the further, tubular, outer radial annular seam 19, which is shown on the right side of the enlarged segment, a further, tubular middle radial annular seam 21 can be created for the further welding together of the two hollow cylinders 3a in the region of their abutting annular surfaces 7 by narrow-gap tungsten inert gas welding. During the entire manufacturing process, the shaft 1 is aligned with a vertically oriented rotational axis 2. There is no need for the tilting required with known methods. The inner and outer diameters of abutting annular surfaces can be the same.

FIG. 2 shows an exemplary embodiment of a manufacturing process. One operation S1 entails the creation of shaft parts, which are symmetrical about a rotational axis 2 and coaxial along the rotational axis 2, including at least one hollow cylinder 3a and optionally at least one cylinder 3. One operation S2 entails the S2 positioning in each case of two shaft parts 5 along the vertical rotational axis 2 coaxially to each other, wherein in each case the annular surface 7 of two hollow cylinders 3a abut each other. One operation S3 entails the creation of a first, tubular, inner radial annular seam 17 in order to weld together the two hollow cylinders 3a in a radial inner region of the associated annular surfaces 7 by narrow-gap tungsten inert gas arc welding. One operation S4 entails the creation of a further, tubular, outer radial annular seam 19 in order further to weld together the hollow cylinders 3a in an outer radial region of the associated annular surfaces 7 by narrow-gap metal gas-shielded arc welding, wherein the rotational axis 2 remains vertically aligned. According to a particularly advantageous embodiment, initially, the first, tubular, inner radial annular seam 17 can be welded between two shaft parts 5 and immediately thereafter the further, tubular outer radial annular seam 19 of the two shaft parts 5. Only thereafter, are the next two shaft parts 5 welded completely together. In principle, it is also possible for initially all first, tubular, inner radial annular seams 17 of the entire shaft 1 to be welded and thereafter all further, tubular outer radial annular seams 19 of all the shaft parts 5. In one operation S3a, the creation of a further, tubular middle radial annular seam 21 in order further to weld together the hollow cylinders 3a by narrow-gap tungsten inert gas-welding can take place after the creation of the first, tubular, inner radial annular seam 17 and before the creation of the further, tubular, outer radial annular seam 19.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method for joint welding a shaft, particularly for a turbine and/or a generator, comprising:
   providing shaft parts, symmetrical about and coaxial along a vertical rotational axis, including at least two hollow cylinders;
   positioning two of the shaft parts coaxially to each other along the vertical rotational axis, with annular surfaces of two hollow cylinders abutting each other;
   forming a tubular inner radial annular seam to weld together the two hollow cylinders in a radial inner region of the annular surfaces by narrow-gap tungsten inert gas arc welding; and
   forming a tubular outer radial annular seam after said forming of the tubular inner radial annular seam to further weld together the two hollow cylinders in an outer radial region of the annular surfaces by narrow-gap metal gas-shielded arc welding, while the vertical rotational axis remains vertically aligned.

2. The method as claimed in claim 1, wherein the tubular outer radial annular seam is welded immediately after the tubular inner radial annular seam between two shaft parts is welded.

3. The method as claimed in claim 1, further comprising forming a tubular middle radial annular seam to further weld together the hollow cylinders by narrow-gap tungsten inert gas welding, after said forming of the tubular inner radial annular seam and before said forming of the tubular outer radial annular seam.

4. The method as claimed in claim 3, wherein said forming of the tubular middle radial annular seam is repeated for all of the shaft parts of the entire rotor shaft prior to said forming of the tubular outer radial annular seams of all of the shaft parts.

5. The method as claimed in claim 4, wherein the tubular middle radial annular seam is radially 2 mm to 20 mm thick.

6. The method as claimed in claim 5, wherein the narrow-gap metal gas-shielded arc welding is one of narrow-gap metal inert gas arc welding and narrow-gap metal active gas arc welding.

* * * * *